US007900829B1

(12) United States Patent
Folk et al.

(10) Patent No.: US 7,900,829 B1
(45) Date of Patent: Mar. 8, 2011

(54) BACK OFFICE INTEGRATION WITH CASH HANDLING DEVICES AND POINT OF SALE DEVICES

(75) Inventors: Amy Baker Folk, Charlotte, NC (US); Daniel Christopher Bohen, Charlotte, NC (US); William Thomas Sanders, Denver, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 110 days.

(21) Appl. No.: 12/277,915

(22) Filed: Nov. 25, 2008

(51) Int. Cl.
*G06K 5/00* (2006.01)

(52) U.S. Cl. ........................................................ 235/380

(58) Field of Classification Search .................. 235/380, 235/379, 382, 383, 493; 194/206, 213, 225, 194/302
See application file for complete search history.

(56) References Cited

U.S. PATENT DOCUMENTS

| | | | | |
|---|---|---|---|---|
| 6,125,988 | A * | 10/2000 | Waters | 194/217 |
| 6,839,688 | B2 | 1/2005 | Drummond et al. | |
| 6,901,387 | B2 | 5/2005 | Wells et al. | |
| 2004/0188920 | A1 * | 9/2004 | Washington et al. | 271/145 |
| 2004/0238629 | A1 * | 12/2004 | Buchholz | 235/383 |
| 2007/0108267 | A1 * | 5/2007 | Jonsson et al. | 235/379 |

* cited by examiner

*Primary Examiner* — Seung H Lee
(74) *Attorney, Agent, or Firm* — Banner & Witcoff, Ltd.; Michael Springs

(57) ABSTRACT

Methods, systems, and devices provide integrated information for receivables, inventory, and/or transactions from point of sale (POS) devices and cash handling device(s) to accounting systems. Transactions (e.g., debit card, credit card, coin, cash, check, etc.) are allowed at POS devices. The transactions may be communicated to cash handling devices through a communication network or by RFID materials (e.g., coupled to or on tills, receipts, printouts, etc.). Transaction-related materials (e.g., paper currency, coins, checks, receipts, etc.) may be moved from the POS devices to cash handling device(s). Actual counts and expected counts may be determined and may be communicated to accounting systems.

24 Claims, 8 Drawing Sheets

BACK OFFICE INTEGRATION WITH CASH HANDLING DEVICES AND POINT OF SALE DEVICES

BACKGROUND

Cash handling devices are used at a variety of locations such as, for example, retail locations. Usually, retail locations will have a plurality of point of sale devices such as, for example, cash registers at locations throughout the store.

Currently, retailers must manually enter or download point of sale data from each point of sale device. The retailer must then manually count and/or recount currency in the till for the point of sale device in order to generate an actual cash count. The retailer must manually enter the actual cash count into a point-of-sale tracking system. Overages and shortages are then calculated.

This reconcilement activity is frequently facilitated through balancing individual register drawers. The total is summed and then forwarded to a corporate accounting function. This allows a corporation to monitor discrepancies between actual and expected store cash balances. Additionally, it gives corporate line of sight into upcoming deposits, which further assists with the reconcilement activity. Oftentimes, point-of-sale information is automatically provided from a store personal computer via an intranet connection. This provides the “expected” cash deposit. Point-of-sale (POS) information may also be keyed into the store personal computer via a software program by a manager and transmitted to corporate via an intranet or Internet network. In addition to POS sales information, a store may also communicate detail or summary level information on the cash deposit for that day. At the end of each shift (or at the end of the day) a manager will enter this data in a back office system for the purposes of communicating the “actual” cash deposit. The data entry may be facilitated by the manager in several ways. The manager (or others) may count the bills manually for each drawer and make an entry into a cash office computer system to specify the total deposit for the day. Alternately, the manager (or others) may place cash/coin into counting devices (e.g. cash discriminators, or cash/coin scales) that transmit data automatically to a back office system. Frequently, POS sales data and deposit data are sent to the corporate accounting function concurrently. The information is stored in a reconciliation program (such as ReconNet) and the books are finally closed when the bank transmits deposit information a few days later. Of course, if there is a discrepancy at that point, corporate accounting works with the store to determine the root cause of the discrepancy.

This type of reconciliation process is labor intensive. In addition, real time information about receivables for the retailer is not available. This is further complicated by the fact that certain transactions, such as credit card transactions, typically do not clear until sometime overnight or the day after the sale. Accordingly, retailers are typically able only to obtain receivable information a day or two after the transactions took place.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In various embodiments, methods, systems, and devices integrate a cash handling device in a retail establishment and provide efficiencies in the processes by which corporate and retail store(s) reconcile daily activity. The cash handling device may be the central mechanism for reconciling point-of-sales activity to actual cash balances for the multiple cash registers that are utilized in any given retail establishment. As such, data on point-of-sales devices may be transmitted directly to the cash handling device so that during reconciliation the software can match up expected cash vs. actual cash input. Alternately, point-of-sales data may bypass the cash handling device and be sent directly to a corporate accounting system. Corporate accounting may then ensure that point-of-sale information matches up with the amount deposited in the handling device. Of course, this could all be done the same day, since there would no longer be a need to wait days for the deposit to reach a demand deposit account.

In one embodiment, transactions may be allowed at a plurality of point of sale devices. Information may be communicated regarding the transactions from the point of sale devices to at least one cash handling device. The information may be used in order to identify an expected count for the drawer equal to sales activity for a given shift or day. Transaction-related materials may be moved from the point of sale devices to said at least one cash handling device. At least some of said transaction-related materials may be counted in order to identify an actual count. The actual count may be compared to the expected count. The actual count and the expected count, as well as other information, may be communicated to an accounting system (e.g., back office, corporate accounting system, point-of-sale tracking system, etc.).

In another embodiment, transactions may be allowed at a plurality of point of sale devices. Information may be communicated regarding the transactions from the point of sale devices to a personal computer. The information may be used by the personal computer in order to identify an expected count. The transaction-related materials may be moved from the point of sale devices to at least one cash handling device. At least some of said transaction-related materials may be counted by the cash handling device in order to identify an actual count. The actual count may be communicated to the personal computer. The personal computer may be used to compare the actual count to the expected count. The actual count and the expected count may be communicated to an accounting system (e.g., back office, corporate accounting system, point-of-sale tracking system, etc.).

In various embodiments, methods, systems, and devices provide integrated receivables, inventory, and/or transaction information for point of sale devices and cash handling device(s). Transactions (e.g., debit card, credit card, coin, cash, check, etc.) are allowed at point of sale devices. The transactions may be communicated to cash handling devices through a communication network or by RFID materials (e.g., coupled to or on tills, receipts, printouts, etc.) Transaction-related materials (e.g., paper currency, coins, checks, receipts, etc.) may be moved from the point of sale devices to cash handling device(s). Actual counts and expected counts may be determined and may be communicated to accounting systems.

In some embodiments, at least one summary may be calculated and may provide information regarding receivables, inventory, or transactions. One or more summaries may be viewed on demand from a remote location.

In one embodiment, transactions at a plurality of point of sale devices are allowed. The transactions may include, but are not limited to: debit card transactions, credit card transactions, coin transactions, cash transactions, check transactions, etc. Information regarding the transactions may be communicated from the point of sale devices through at least one communication network to at least one cash handling device. Transaction-related materials (e.g., paper currency, coins, checks, receipts, bar coded receipts, receipts including RFID tags/tickets/labels or RFID indicia contained thereon or therein, etc.) may be moved from the point of sale devices to said at least one cash handling device. At least one summary may be calculated at said cash handling device.

In another embodiment, each point of sale device includes a till. The transaction-related materials may be stored in the till. The transaction-related materials may be transported in the till during movement of the transaction related materials from the point of sale devices to said at least one cash handling device.

In a further embodiment, tills may include an RFID device that stores the information about the transactions and may be read by said at least one cash handling device when the till is moved to the cash handling device(s).

In yet another embodiment, one or more summaries may be created. Sample summaries may include a card summary, a cash summary, and a non-cash summary. Summaries may be included in single views or reports. Alternatively or additionally, summaries may be broken out into separate views or reports.

In still another embodiment, information regarding the transactions at the point of sale devices may be obtained on demand. This may be obtained from accessing said at least one cash handling device or from accessing another location where the information may be stored. In some embodiments, the information may be updated on a real-time basis. In other embodiments, the information may be updated periodically, at other intervals, or simply when desired.

In yet a further embodiment, transactions may be allowed at point of sale devices, said transactions selected from the group consisting of: debit card transactions, credit card transactions, coin transactions, cash transactions, and check transactions. A breakdown of the transactions may be provided to at least one cash handling device. At least one cash handling device may accept coins and cash from the point of sale devices. Said at least one cash handling device may count the coins and cash from the point of sale devices and compare the breakdown to the counted coins and counted cash. Said at least one cash handling device may prepare at least one summary at the cash handling device regarding all of the transactions for all of the point of sale devices.

In another embodiment, at least one summary may be viewed remotely over at least one communication network that is coupled to said at least one cash handling device.

In a different embodiment, the breakdown may be printed at each said point of sale device and read at said at least one cash handling device. Alternatively or additionally, the breakdown may be transmitted over at least one communication network from the point of sale device(s) to at least one cash handling device.

In a further embodiment, the breakdown may be transmitted to a point of sale tracking system.

In some embodiments, the breakdown may be provided at the end of each business day. In other embodiments, the breakdown may be provided at the end of each shift.

In yet another embodiment, a till may be moved from each said point of sale device to said at least one cash handling device in order to move said coins and said cash from each said point of sale device to said at least one cash handling device.

In yet a further embodiment, a system may include at least one communication network, a plurality of point of sale devices coupled to said at least one communication network, and a cash handling device coupled to said at least one communication network. The point of sale devices may include removable tills for storing transaction-related materials (e.g., cash, coins, checks, receipts, etc.). The tills may have RFID devices (embedded therein or affixed thereto) for storing information regarding transactions conducted at the point of sale devices. Said at least one cash handling device may include: a processor for executing computer-executable instructions; memory that stores the computer-executable instructions; recycling units for storing currency, said recycling units holding different first currency denominations; user input means; an input mechanism to receive said tills; an RFID reader to read said transaction information from said tills; a bill scanner to validate the cash; or a scanner to scan the checks and the receipts. Cash handling devices may also optionally include a coin recycler that has: a coin input opening for receiving the coins; a feeding disc to route the coins past a recognition device, said recognition device determining whether said coins are foreign objects; an exit to discard said foreign objects; a sort mechanism to store said coins in stackers for dispensation; a transport mechanism to move said coins from said stackers to said exit for dispensation; and a communication interface coupled to said at least one communication network. Computer-executable instructions on the cash handling device may: read the RFID devices in order to obtain the information regarding the transactions conducted at the point of sale devices; count the coins and the cash provided to the cash handling device; create at least one summary regarding the transactions conducted at the point of sale devices; and allow said at least one summary to be viewed remotely over said at least one communication network. Additionally or alternatively, a bar code may be printed at a point-of-sale device. The bar code may be read by a cash handling device in order to obtain expected count(s) for transactions. Printing of bar codes may be prompted, if desired, by a cashier logging off a point-of-sale device.

In yet a further embodiment, a system may include: at least one communication network; a plurality of point of sale devices coupled to said at least one communication network, said point of sale devices including removable tills for storing transaction-related materials selected from the group consisting of: cash, coins, checks, and receipts, said tills having RFID devices for storing information regarding transactions conducted at the point of sale devices; and at least one cash handling device. The cash handling device may include: a processor for executing computer-executable instructions; memory that stores the computer-executable instructions; recycling units for storing currency, said recycling units holding different first currency denominations; user input means; an input mechanism to receive said tills; an RFID reader to read said transaction information from said tills; a scanner to scan the cash, the checks, and the receipts; and a coin recycler having: a coin input opening for receiving the coins; a feeding disc to route the coins past a recognition device, said recognition device determining whether said coins are foreign objects; an exit to discard said foreign objects; a sort mechanism to store said coins in stackers for dispensation; a transport to move said coins from said stackers to said exit for dispensation; and a communication interface coupled to said at least one communication network. The computer-executable instructions may: read the RFID devices in order to obtain the information regarding the transactions conducted at the point of sale devices; count the coins and the cash provided to the cash handling device; determine an actual count and an expected count; and communicate the actual count and the expected count to an accounting system.

In yet another embodiment, a system may include: at least one communication network; a plurality of point of sale devices coupled to said at least one communication network; a personal computer coupled to said at least one communication network, said personal computer receiving transaction information from said point of sale devices and uses the transaction information in order to identify an expected count; and at least one cash handling device. The cash handling device may include: a processor for executing computer-executable instructions; memory that stores the computer-executable instructions; recycling units for storing currency, said recycling units holding different currency denominations; user input means; an input mechanism to receive cash and coins; a scanner to scan the cash; a coin recycler having: a coin input opening for receiving the coins; a feeding disc to route the coins past a recognition device, said recognition device determining whether said coins are foreign objects; an exit to discard said foreign objects; a sort mechanism to store said coins in stackers for dispensation; a transport mechanism to move said coins from said stackers to said exit for dispensation; and a communication interface coupled to said at least one communication network. The computer-executable instructions: may count the coins and the cash provided to the cash handling device to identify an actual count; and communicate the actual count to the personal computer. The personal computer may compare the actual count to the expected count and communicate the actual count and the expected count to an accounting system.

In still another embodiment, the cash handling device may be a cash recycler.

In a further embodiment, the cash handling device may be a deposit only machine.

In still further embodiments, one or more steps may be implemented as computer-executable instructions stored on a computer-readable medium.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, methods, systems, and devices are illustrated for providing integrated receivables and/or inventory information from point of sale (POS) devices and cash handling device(s) as well as to corporate accounting systems.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers, currency dispensers, depository machines, and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
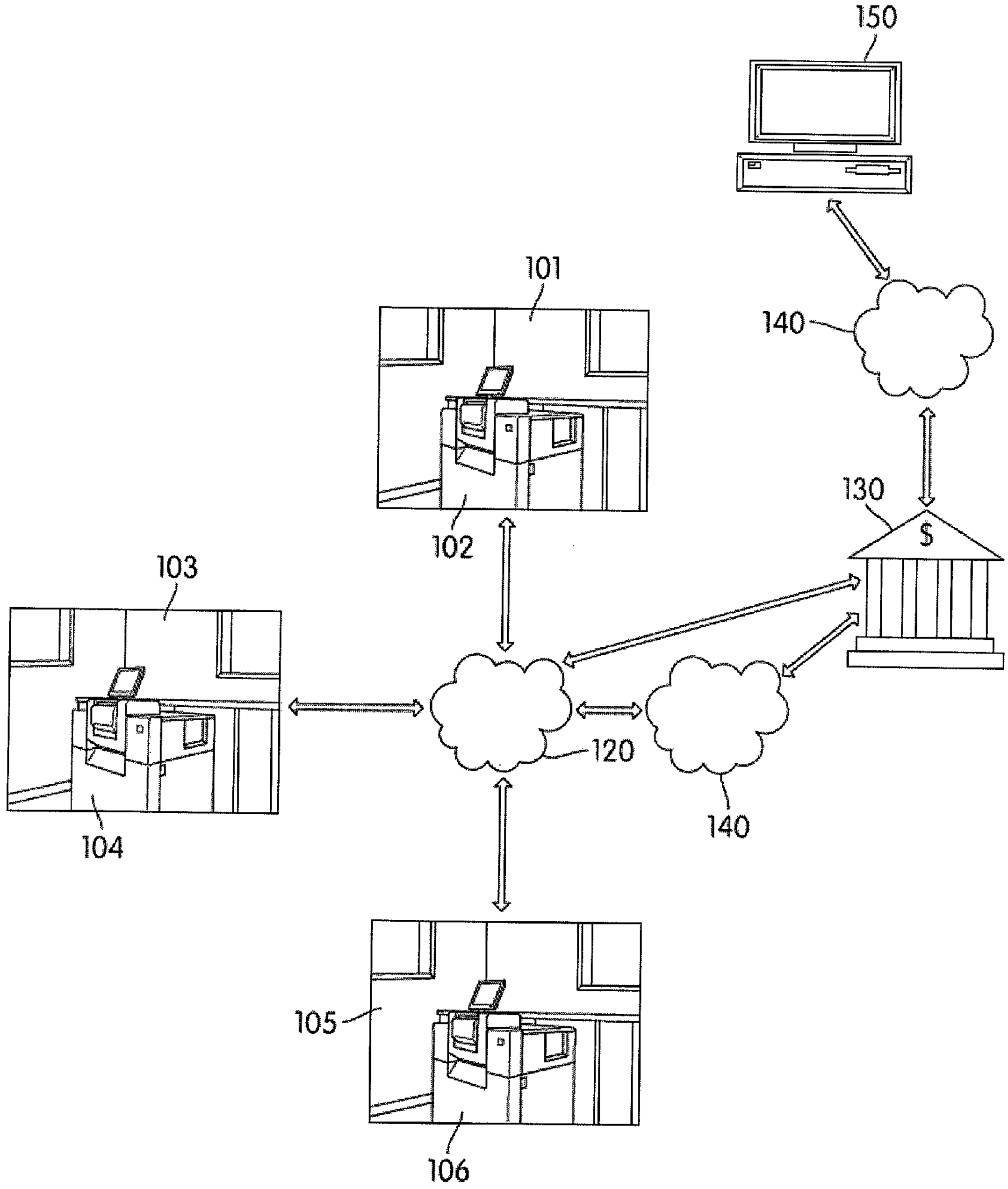
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
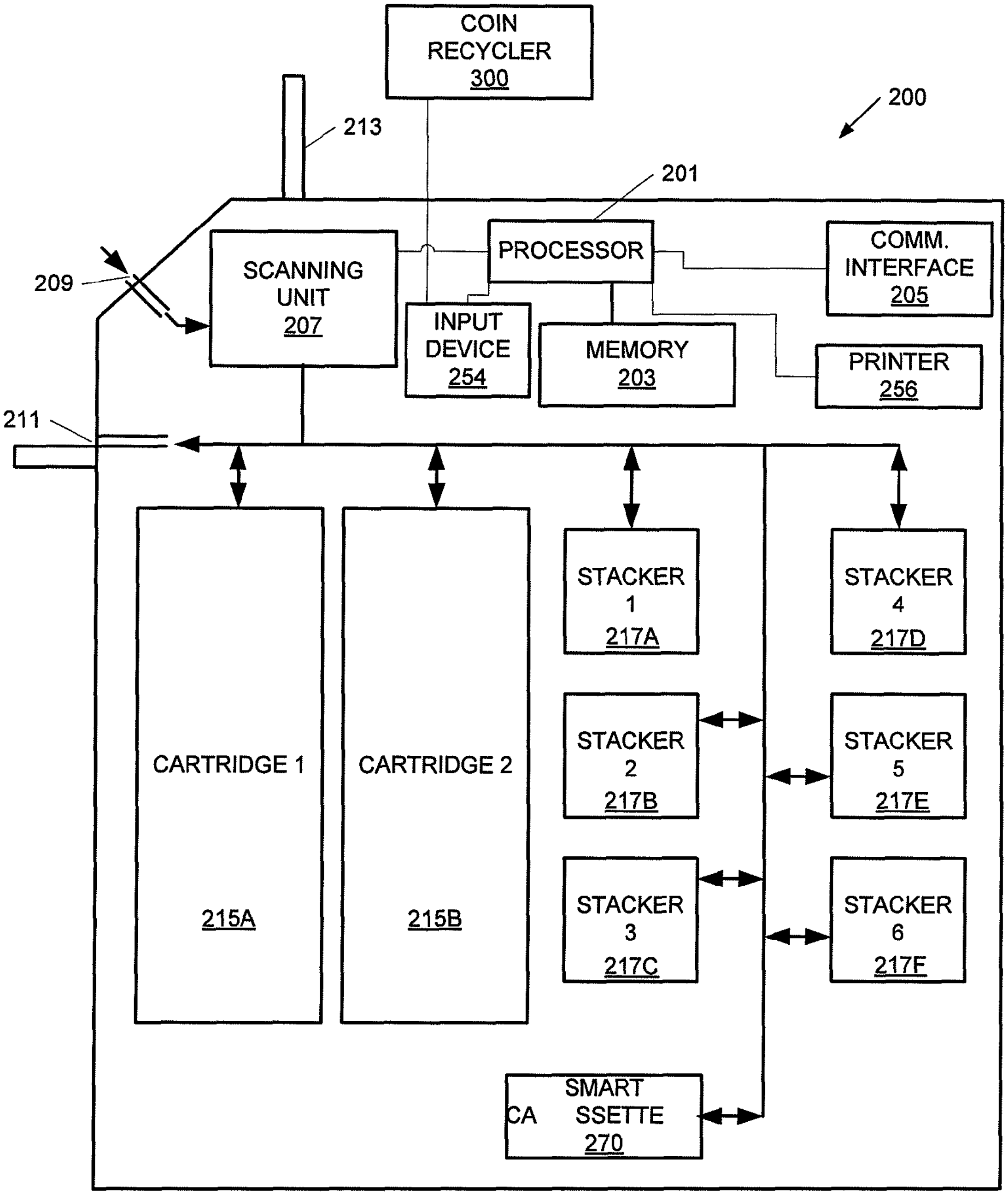
FIG. 2 illustrates a simplified diagram of a cash handling device in accordance with an aspect of the invention.

FIG. 2 illustrates a cash recycler 200 which may further provide display 213 to present data and/or messages to a user. For example, display 213 may be configured to display a recycler balance, a transaction interface, a current deposit count, security options, transportation options and the like.

One or more input devices 254 such as an antenna, serial port, infrared port, Bluetooth module, firewire port, keypad, keyboard, mouse, touchscreen, fingerprint scanner, retinal scanner, proximity card reader, RFID scanner and/or writer, magnetic card reader, barcode reader, and/or combinations thereof may also be included in or connected to recycler 200.

In addition, a coin recycler 300 or other input mechanism to capture non-cash items may also be coupled to the cash handling device 200. The coin recycler 300 may be a stand alone device that is coupled to the cash handling device 200 via one or more of the above-identified input devices 254. This would allow information regarding what coins were deposited into the coin recycler 300 or withdrawn from the coin recycler to be communicated to processor 201 for appropriate crediting, debiting, or other action. In an alternative embodiment, persons of skill in the art will understand that the coin recycler 300 may be integral with and integrated into the cash handling device 200.

One or more printers 256 may also be included in or connected to recycler 200 for printing receipts and notifications as well.

In cash recycler 200, recycling units (also known as stackers, rolled-stored modules, or recycling modules) 217 and cartridges 215 are configured to store currency. One or more stackers 217 or cartridges 215 may also provide storage for overflow currency such as, for example, a larger quantity of one or more denominations than can be physically stored in stacker 217 or cartridge 215.

Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Preferably, each stacker 217 may be capable of accepting and dispensing a single denomination. Each stacker and any overflow cassette (i.e., for storing overflow quantities of one or more denominations) may be configured with one or more thresholds via a local or remote graphical user interface. Example thresholds include, but are not limited to, a minimum, a maximum, and a target. The thresholds may be assigned arbitrarily or by any desired methodology.

A minimum threshold may be, for example, a calculated lower bill quantity threshold for a given denomination. Once the minimum is reached or approached, the client may be in danger of running out of a specific denomination given historical cash usage patterns.

A target threshold may be the ideal bill quantity for a given denomination. This may be the calculated quantity for a given denomination that may minimize transportation runs given module capacity and historical cash usage patterns.

A maximum threshold may be the calculated upper bill quantity threshold for a given denomination. Once the maximum threshold is reached or approached, the client may be in danger of running out of capacity for a specific denomination given module capacity and historical cash usage patterns.

In an aspect of the invention, the cash handling device 200 may also be connected to a financial institution via communication network 120 (FIG. 1). This may enable the financial institution to monitor and/or control on a real time or periodic basis how much cash, currency, or coins are contained in the cash handling device 200.

Cash handling devices 200 are stocked initially with inventory. Each stacker 217 (FIG. 2) may be provided the ideal bill quantity for a given denomination or may be loaded with another predetermined quantity of bills.

Through the normal course of business, a client may deposit into and/or withdraw from the cash handling device 200 various amounts of paper and/or coin currency. This will cause the inventory of various denominations to rise and fall. One or more cash handling devices, banks, remote computers, point of sale tracking system, or other monitoring facilities may monitor inventory or receivables on real time, on a periodic basis, or at other time intervals.

If a minimum or maximum threshold is reached or approached, one or more alerts may be sent and/or service may be scheduled, if desired. For example, an alert may be sent that requests withdrawal or replenishment of certain denominations. Alternatively or in addition, the alert may request or indicate that the quantity of one or more denominations may be adjusted to target level(s). The alert may be sent to any monitoring facility and/or to a transportation service. Servicing of the cash handling device may be scheduled automatically or manually.

Inventory levels may then be adjusted. In particular, change order(s) may be issued as a result of one or more alerts. The change order(s) may be delivered to a cash handling device by a transportation service or may be handled locally as transfers by individuals at the client's location. Change orders may be deposited to bring denominations that require replenishment to target or other appropriate levels. Similarly, withdrawals may be performed to decrease excess inventory to target or other appropriate levels. In addition, these change orders may be placed in a central cassette and the machine may route the funds to the appropriate device that requires the notes.

Paper currency and/or coins that are removed from the cash handling device may be transferred to one or more other cash handling devices or returned to a bank facility or other appropriate location. Inventory levels and receivables may then continue to be monitored or controlled in real time, on a periodic basis, or at other time intervals.

Inventory levels may also be adjusted by use of smart cassettes 270 (FIG. 2) that are self balancing and/or that may be moved from one cash handling device to another. In addition to monitoring and/or controlling inventory for a specific cash handling device, inventory levels may be monitored and/or controlled for all cash handling devices assigned to a client or at a certain location. If desired, cartridges 215A or 215B may be the smart cassette 270. Alternatively, the smart cassette 270 may be a separate module. In addition, one or more of the cassettes may be configured so as to receive a till from a point of sale device and to remove paper currency, coins, or other transaction-related materials therefrom.

In addition, smart cassettes 270 may be used, for example, during transportation carrier runs. In particular, the smart cassettes 270 enable the networked cash handling devices 200 to act together as a combined unit. Consequently, the carrier may not remove inventory from one cash handling device in order to reach its target level(s) if another cash handling device is low on funds.

In addition, inventory levels may be adjusted during any normal service visit by a transportation carrier as well.

Figure 3A:
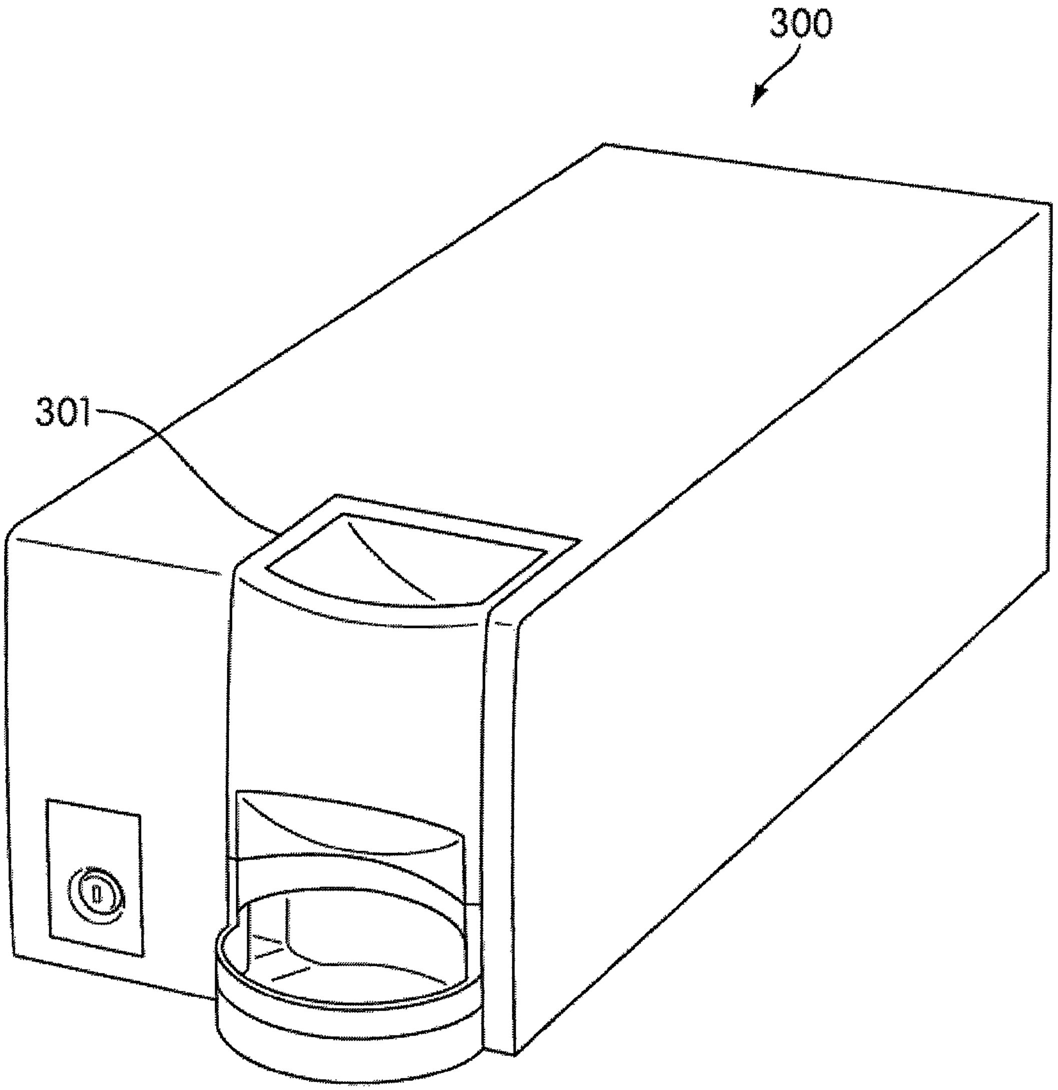
FIG. 3A illustrates an example of a coin recycler that may be used in conjunction with a cash handling device as well as with a point of sale register.
Figure 3B:
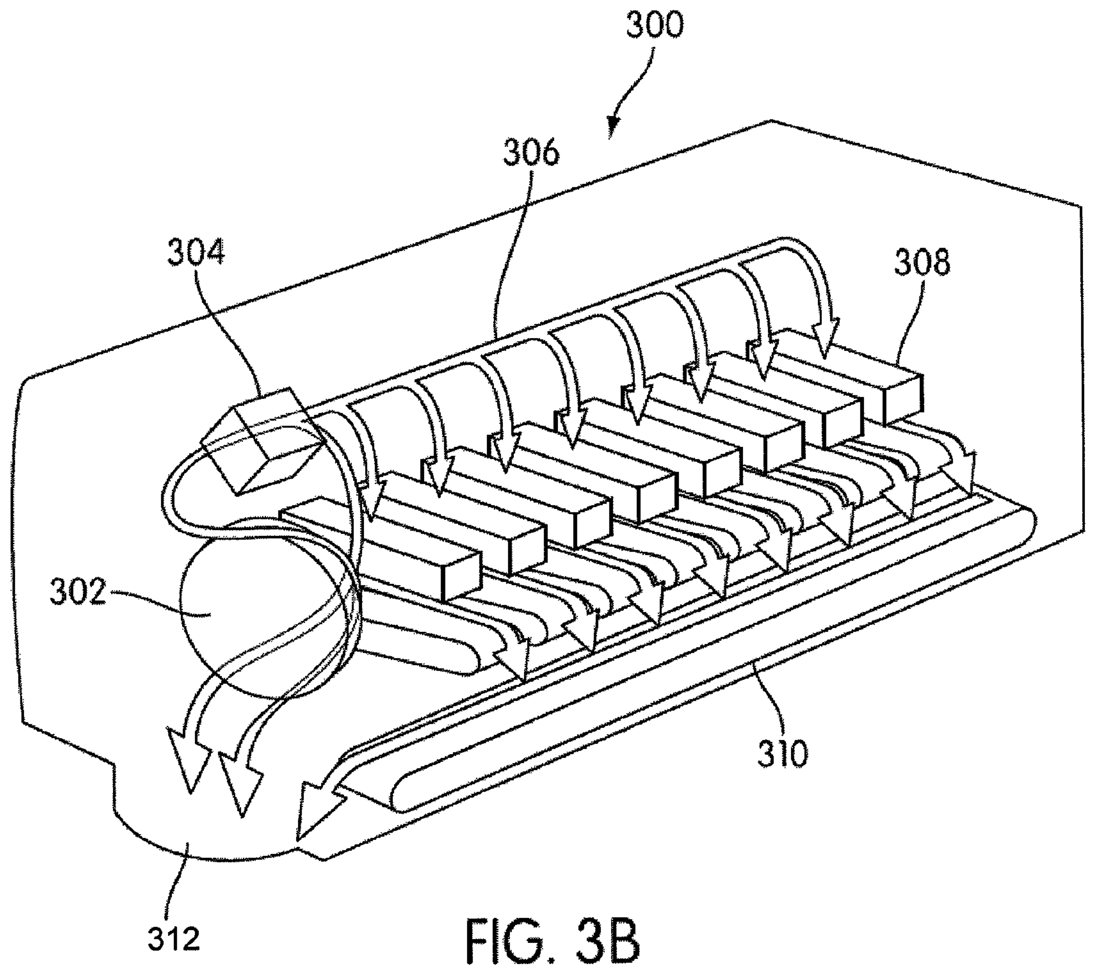
FIG. 3B illustrates the inner portion of a coin recycler such as shown in FIG. 3A.

FIGS. 3A-3B illustrate a sample coin recycler 300 that may be used in conjunction with the present invention. Suitable coin recyclers 300 may be obtained from Glory USA or other coin recycler manufacturers. Suitable coin scales include the MX-300 digital coin scale, which is commercially available from My Weigh.

As illustrated in FIGS. 3A and 3B, coins may be input into a coin recycler 300 via a coin input opening 301. A feeding disc 302 may then route inputted coins past a recognition device 304 that may determine whether the input object is a coin or a foreign object and, if a coin, what value of coin it is. Foreign objects may be discarded through an exit 312. Legitimate input coins may be sorted via sorted mechanism 306 such that like coins are stored in the same stacker(s) 308. Coins may be dispensed as appropriate by discharging the coins from the stacker(s) 308 to a transport 310 and out through an exit 312.

Figure 4:
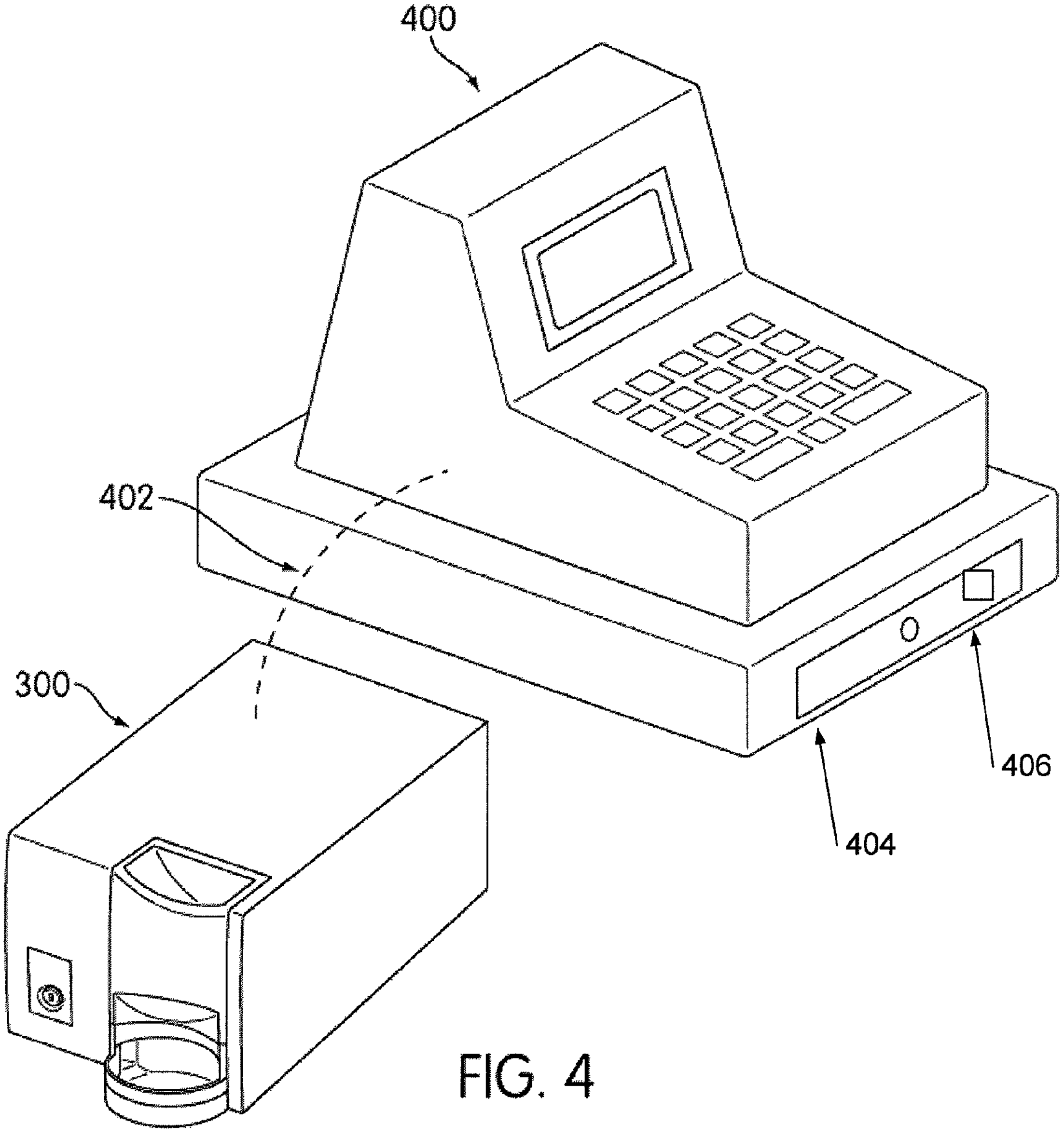
FIG. 4 shows a coin recycler coupled to a point of sale register.

As shown in FIGS. 2 and 4, one or more coin recyclers 300 may be coupled to a cash handling device 200 as well as a point of sale device (e.g., cash register) 400. For example, in one embodiment, a coin recycler 300 may be coupled to a cash handling device 200 in a retail back office. Another coin recycler 300 may be coupled 402 to a point of sale register 400 in the front of a retail establishment where customers purchase merchandise. The point of sale device 400 may have a till 404 where transaction-related materials are stored such as, for example, paper currency, coins, credit card transaction receipts, debit card transaction receipts, checks, etc. The till 404 may include, be embedded with, or have affixed thereon an RFID device or RFID indicia 406 such as an RFID tag, ticket, label, chip, etc. capable of storing information regarding the point of sale device 400 as well as transactions (e.g., debit card, credit card, coin, cash, check, etc.) at that point of sale device.

The coupling between the coin recycler and the cash handling device may be wired or wireless. Similarly, the coupling between the coin recycler and the point of sale register may be wired or wireless.

In an aspect of the invention, the cash handling device 200 may also be connected to a financial institution via communication network 120. This may enable the financial institution to monitor on a real time or periodic basis how much cash, currency, or coins are contained in the cash handling device 200. Further, one or more summaries may be viewed on demand from remote or local locations.

Figure 5:
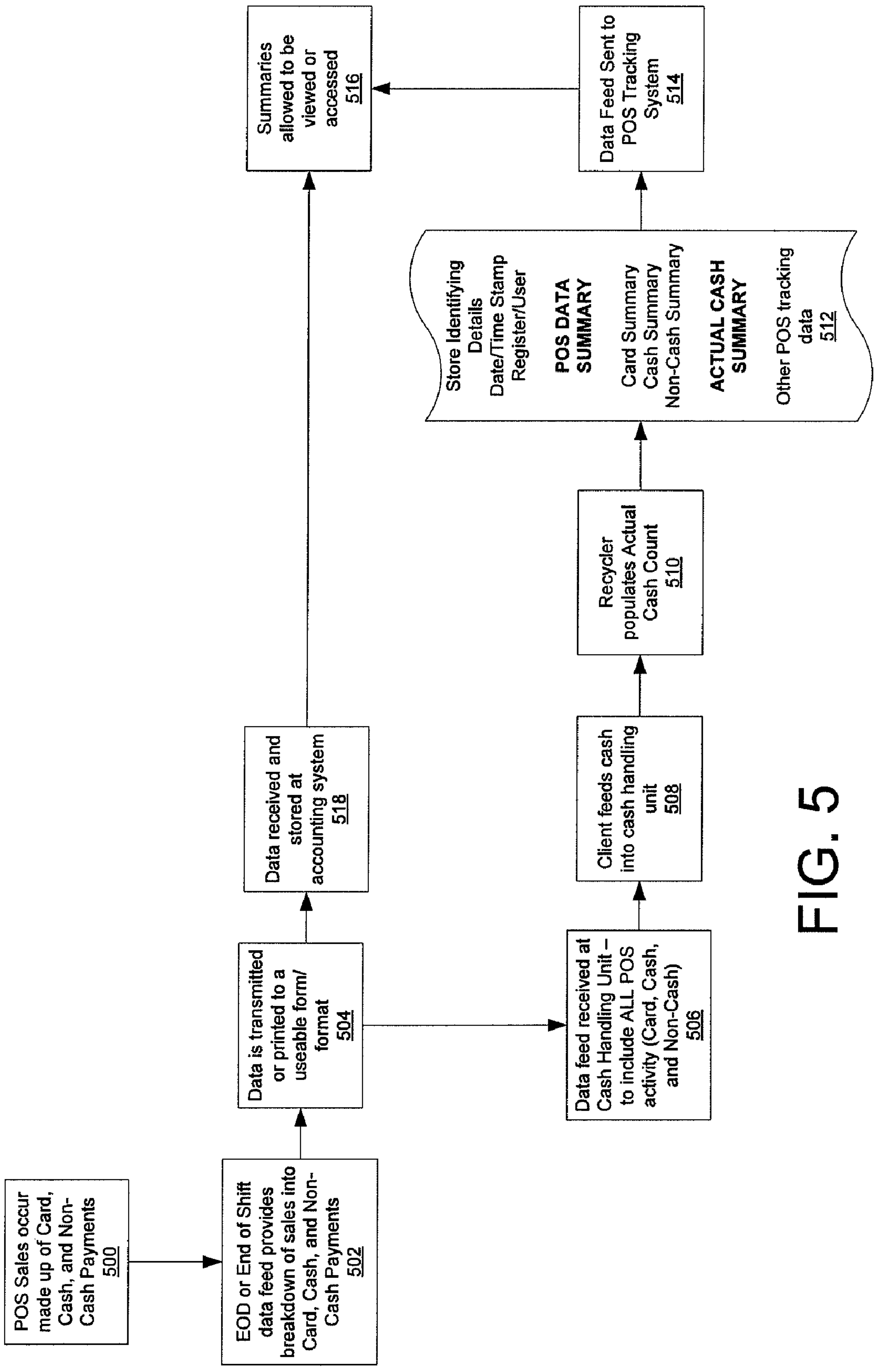
FIG. 5 illustrates an example method for providing integrated receivables, transaction, and/or inventory information from point of sale devices and cash handling device(s).

FIG. 5 illustrates an example method for providing integrated receivables, transaction, and/or inventory information from point of sale devices and cash handling device(s).

As shown in FIG. 5, sales occur 500 at a point of sale device 400 (FIG. 4). These transactions may be debit card transactions, credit card transactions, payments with coins, payments with cash, payments by check, etc.

At the end of the day, end of a shift, or at another desired time, a data feed may provide a breakdown of the sales into card, cash, and/or non-cash payments 502. The data may be transmitted over a communication network or printed to a usable form or format 504. The data feed may be received 506 at the cash handling device 200 (FIG. 2). Preferably, the data feed will include all of the transaction and activity information for the point of sale device for the appropriate period of time. Alternatively, the data feed may be received 518 at a back office, corporate accounting system, and/or point-of-sale tracking system for reconciliation, tracking, analysis, and/or storage.

Cash and/or coins may be input 508 into the cash handling device 200 (FIG. 2). Checks may also be scanned in order to create and store check images in the cash handling device 200 (FIG. 2). Credit card receipts and/or debit card receipts may also be scanned or otherwise input into the cash handling device by, for example, scanning the receipts themselves, scanning bar codes on the receipts, reading RFID information from the receipts, reading RFID information from tills, etc. Deposited cash and/or coins may be counted 510. The count for the deposited cash and/or coins may be compared with the amount of money reported in the data feed to be present.

One or more summaries may be created by the cash handling device(s) 512. The summaries may be created on demand or at other intervals. The summaries may include a variety of information such as, for example, store identifying details, date information, time information, transaction information, card-transaction information, non-card-transaction information, cash and/or coin transaction information, inventory information, actual cash summaries for a cash handling device or a location, other point of sale tracking data, etc. If desired, a data feed regarding some or all of this information may be provided to a point of sale tracking system 514. Additionally, or alternatively, the data feed may be provided to a back office and/or corporate accounting system for reconciliation, tracking, analysis, and/or storage. The summaries may be communicated to or viewed from the cash handling device 200 (FIG. 2), local or remote computers coupled thereto, a financial institution, or another authorized entity or device 516.

The summaries may be static. Alternatively, the summaries may allow a user to drill down into more detailed information as desired. For example, this may be accomplished by creating the summaries in HTML format.

Figure 6:
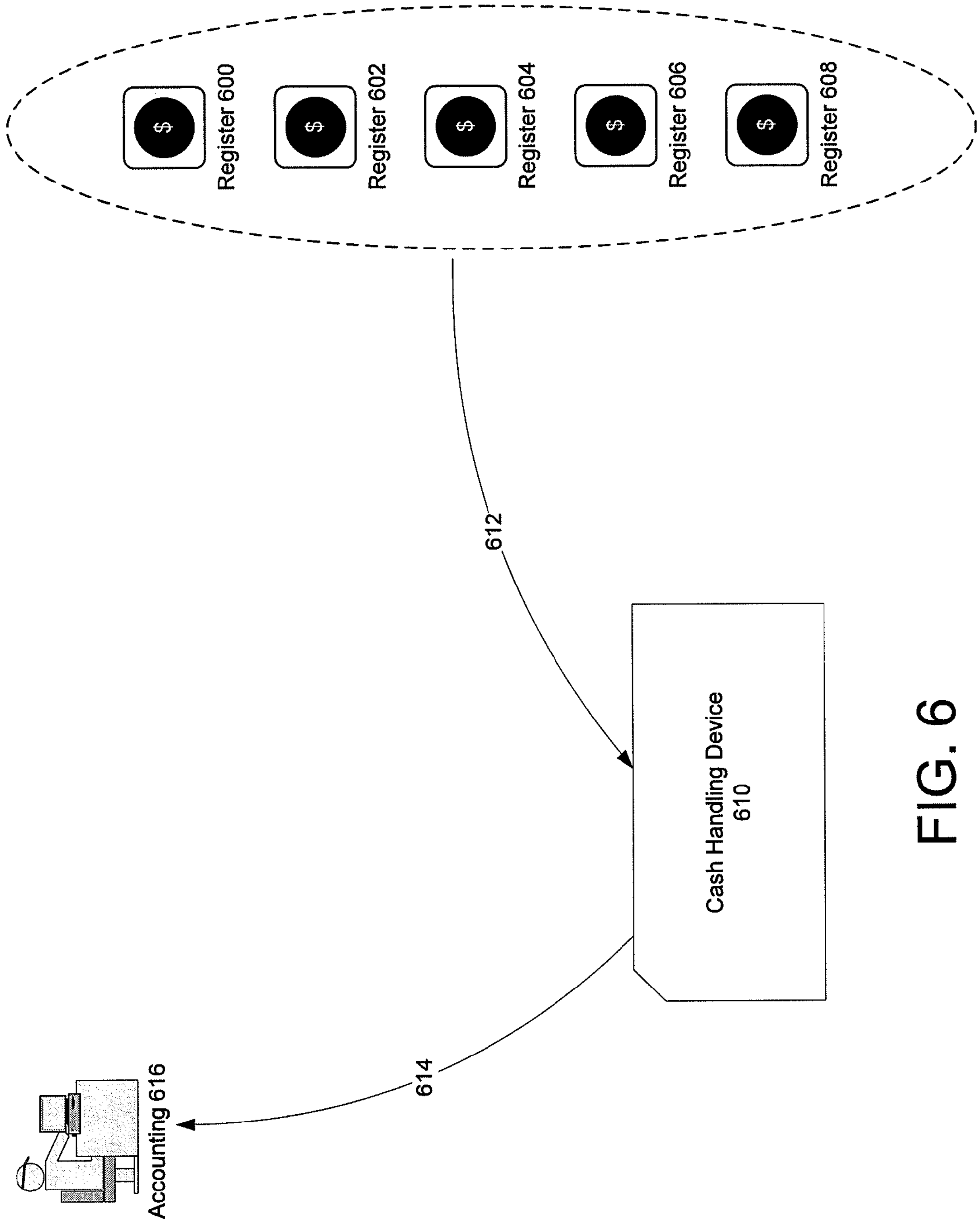
FIG. 6 shows a sample scenario in which a cash handling device may perform the actual cash count, receive the expected cash count, and provide information to a back office, corporate accounting system, and/or point-of-sale tracking system.

FIG. 6 shows a sample scenario in which a cash handling device may perform the actual cash count, receive the expected cash count, and provide information to a back office, corporate accounting system, and/or point-of-sale tracking system.

As shown in FIG. 6, one or more registers 600-608 may be provided. The registers 600-608 may be like register 400 (FIG. 4) and may or may not include a coin recycler 300 (FIG. 3).

As explained above in reference to FIG. 5, sales transactions occur 500 at the registers 600-608. Data is communicated 612 from the registers 600-608 to a cash handling device 610. The data may be transmitted over a communication network or printed to a usable form or format 504. Alternatively, a manager or other authorized individual may manually transport a till 404 (FIG. 4), register drawer, or smart cassette to the cash handling device. The till 404 (FIG. 4) or smart cassette may be recognized automatically such as, for example, by reading an RFID tag, ticket, or label 406 (FIG. 4). Or, the user may manually key into the cash handling device 610 identification information.

Reconciliation of the register drawer 404 may accomplished by insertion of the till 404 (FIG. 4) into the cash handling device 610 and/or by feeding cash, coins, or transaction-related materials into the cash handling device 610. A count may be performed in order to determine the actual amount of cash and/or coins that were deposited. This information may then be compared with the expected amount of cash and/or coins that was communicated to the cash handling device 610.

Notes, memoranda or other information may also be correlated for any of these transactions in a cash handling device. In particular, information may be entered or specified by a user if a predefined notation or indication for the issue is not defined in the cash handling device. Using such a system, a cash handling device and a business or other customer may be able to compensate for issues based on the additional information. This type of functionality was disclosed in co-pending application Ser. No. 12/183,895 entitled "Correlation of Information to a Transaction in a Cash Handling Device," which was filed on Jul. 31, 2008. This application is incorporated herein in its entirety by reference. This feature may be useful, for example, to explain any over/under situations, etc.

The actual cash count, the expected cash count, over/under information as well as any notes, memoranda, or other information may be communicated 614 to a back office, corporate accounting system, and/or point-of-sale tracking system, which is generically represented in FIG. 6 as accounting 616.

Figure 7:
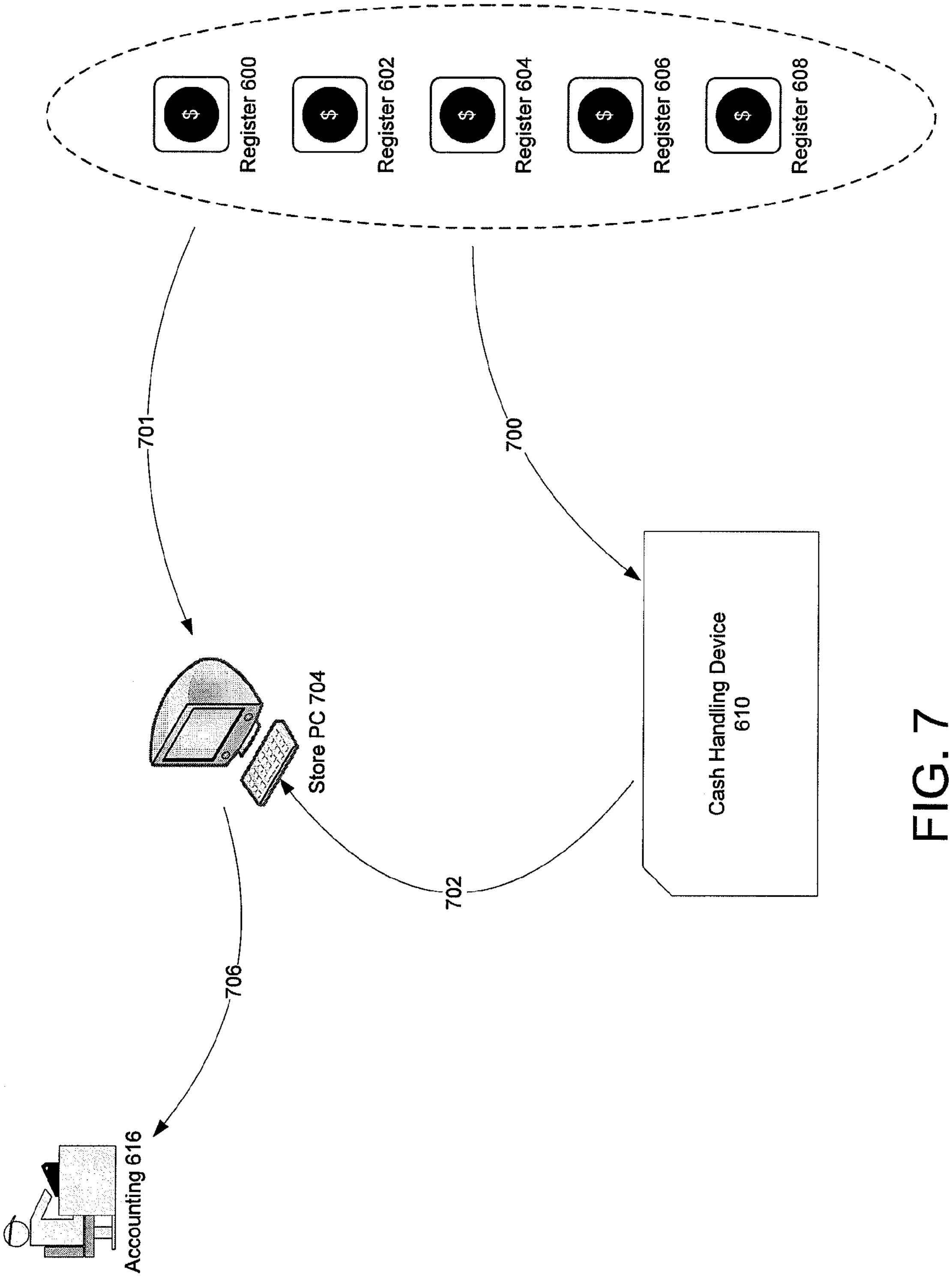
FIG. 7 shows a sample scenario in which a cash handling device may perform the actual cash count, a local computer may receive or enter the expected cash count, and the local computer may provide information to a back office, corporate accounting system, and/or point-of-sale tracking system.

FIG. 7 shows a sample scenario in which a cash handling device may perform the actual cash count, a local computer may receive or enter the expected cash count, and the local computer may provide information to a back office, corporate accounting system, and/or point-of-sale tracking system.

In this example, currency and/or coins may be transferred manually 700 in a register drawer 404 (FIG. 4) or smart cassette to the cash handling device 610, which may then count the currency and/or coins in order to identify an actual cash count. The actual cash count may be communicated 702 to a personal computer 704 at the location. The communication may be electronic or the actual count may be manually entered at the personal computer 704. The actual count may then be compared at the personal computer 704 with sales data transmitted from 701 or manually entered from the registers 600-608.

Again, the actual cash count, the expected cash count, over/under information as well as any notes, memoranda, or other information may be communicated 706 to a back office, corporate accounting system, and/or point-of-sale tracking system, which is generically represented in FIG. 7 as accounting 616.

Thus, the present invention captures and provides information regarding receivables, inventory, and/or transactions for point of sale devices and cash handling device(s). It also provides integration with back office and corporate accounting systems.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:

allowing transactions at a plurality of point of sale devices;

communicating information regarding the transactions from the point of sale devices to at least one cash handling device, the transactions including cash and non-monetary payments;

using the information in order to identify an expected count;

moving transaction-related materials from the point of sale devices to said at least one cash handling device;

counting, by a processor, at least some of said transaction-related materials in order to identify an actual count;

comparing, by the processor, the actual count to the expected count;

communicating the actual count and the expected count to an accounting system; and networking a plurality of cash handling devices to act together as a combined unit.

2. The method of claim 1 wherein the transactions are selected from the group consisting of: debit card transactions, credit card transactions, coin transactions, cash transactions, and check transactions.

3. The method of claim 2 wherein the transaction-related materials are selected from the group consisting of paper currency, coins, checks and receipts.

4. The method of claim 3 wherein each said receipt includes a bar code.

5. The method of claim 3 wherein the information is communicated over a communication network from the point of sale devices to said at least one cash handling device.

6. The method of claim 3 wherein each said point of sale device includes a till, the transaction-related materials are stored in the till, and the transaction-related materials are transported in the till during movement of the transaction related materials from the point of sale devices to said at least one cash handling device.

7. The method of claim 6 wherein each said till includes an RFID device that stores the information about the transactions and is read by said at least one cash handling device when the till is moved to the cash handling devices.

8. The method of claim 7 wherein each said till is manually moved from each said point-of-sale device to said at least one cash handling device.

9. The method of claim 8 wherein each said till is a smart cassette and wherein the smart cassette is moved from a first cash handling device to a second cash handling device.

10. The method of claim 9, further comprising:

adjusting inventory levels by moving the smart cassette from the first cash handling device to the second cash handling device.

11. The method of claim 1, further comprising:

preventing inventory from being moved from one of the plurality of cash handling devices to reach a predetermined target level when another of the plurality of cash handling devices is low on funds.

12. The method claim 1, further comprising:

initiating an action at one of the plurality of cash handling devices based on a status of another of the plurality of cash handling devices.

13. A method comprising:

allowing transactions at a plurality of point of sale devices;

communicating information regarding the transactions from the point of sale devices to a personal computer, the transactions including cash and non-monetary payments;

using, by the personal computer, the information in order to identify an expected count;

moving transaction-related materials from the point of sale devices to at least one cash handling device;

counting, by said at least one cash handling device, at least some of said transaction-related materials in order to identify an actual count;

communicating the actual count to the personal computer;

using the personal computer to compare the actual count to the expected count;

communicating the actual count and the expected count to an accounting system; and networking a plurality of cash handling devices to act together as a combined unit.

14. The method of claim 13 wherein the transactions are selected from the group consisting of: debit card transactions, credit card transactions, coin transactions, cash transactions, and check transactions.

15. The method of claim 14 wherein the transaction-related materials are selected from the group consisting of paper currency, coins, checks and receipts.

16. The method of claim 15 wherein each said receipt includes a bar code.

17. The method of claim 15 wherein the information is communicated over a communication network from the point of sale devices to said at least one cash handling device.

18. The method of claim 15 wherein each said point of sale device includes a till, the transaction-related materials are stored in the till, and the transaction-related materials are transported in the till during movement of the transaction related materials from the point of sale devices to said at least one cash handling device.

19. The method of claim 18 wherein each said till includes an RFID device that is read by said at least one cash handling device when the till is moved to the cash handling devices.

20. The method of claim 19 wherein each said till is manually moved from each said point-of-sale device to said at least one cash handling device.

21. The method of claim 20 wherein each said till is a smart cassette and wherein the smart cassette is moved from a first cash handling device to a second cash handling device.

22. The method of claim 21, further comprising:

adjusting inventory levels by moving the smart cassette from the first cash handling device to the second cash handling device.

23. A system communicating through at least one communication network, the system comprising:

a plurality of point of sale devices coupled to said at least one communication network, said point of sale devices including removable tills for storing transaction-related materials selected from the group consisting of: cash, coins, checks, and receipts, said tills having RFID devices for storing information regarding transactions conducted at the point of sale devices; and at least one cash handling device including:

a processor for executing computer-executable instructions;

memory that stores the computer-executable instructions;

recycling units for storing currency, said recycling units holding different first currency denominations;

user input means;

an input mechanism to receive said tills;

an RFID reader to read said transaction information from said tills;

a scanner to scan the cash, the checks, and the receipts, wherein the checks and the receipts comprise paper media;

a coin recycler having:

a coin input opening for receiving the coins;

a feeding disc to route the coins past a recognition device, said recognition device determining whether said coins are foreign objects;

an exit to discard said foreign objects;

a sort mechanism to store said coins in stackers for dispensation;

a transport to move said coins from said stackers to said exit for dispensation;

a communication interface coupled to said at least one communication network;

wherein the computer-executable instructions:

read the RFID devices in order to obtain the information regarding the transactions conducted at the point of sale devices;

count the coins and the cash provided to the cash handling device;

determine an actual count and an expected count; and communicate the actual count and the expected count to an accounting system.

24. A system comprising:

at least one communication network;

a plurality of point of sale devices coupled to said at least one communication network;

a personal computer coupled to said at least one communication network, said personal computer receiving transaction information from said point of sale devices and uses the transaction information in order to identify an expected count;

at least one cash handling device including:

a processor for executing computer-executable instructions;

memory that stores the computer-executable instructions;

recycling units for storing currency, said recycling units holding different currency denominations;

user input means;

an input mechanism to receive cash and coins;

a first scanner to scan the cash;

a second scanner to scan payments other than money, wherein the payments comprise paper media;

a coin recycler having:

a coin input opening for receiving the coins;

a feeding disc to route the coins past a recognition device, said recognition device determining whether said coins are foreign objects;

an exit to discard said foreign objects;

a sort mechanism to store said coins in stackers for dispensation;

a transport to move said coins from said stackers to said exit for dispensation;

a communication interface coupled to said at least one communication network;

wherein the computer-executable instructions:

count the coins and the cash provided to the cash handling device to identify an actual count; and communicate the actual count to the personal computer;

wherein said personal computer compares the actual count to the expected count and communicates the actual count and the expected count to an accounting system.

* * * * *